UNITED STATES PATENT OFFICE.

JOHN M. RAUHOFF, OF TINLEY PARK, ILLINOIS.

PROCESS OF RENDERING CEMENT BLOCKS WATERPROOF.

No. 830,003.  Specification of Letters Patent.  Patented Sept. 4, 1906.

Application filed September 20, 1905. Serial No. 279,242.

*To all whom it may concern:*

Be it known that I, JOHN M. RAUHOFF, a citizen of the United States, residing at Tinley Park, in the county of Cook and State of Illinois, have invented a certain new and useful Improvement in Processes of Rendering Cement Blocks Waterproof, of which the following is a specification.

It is well known that cement blocks are open to the objection of absorbing moisture to a greater or less extent, thereby creating dampness which is specially objectionable where cement blocks are used for building purposes.

The objects of the present invention are to make a waterproof compound which can be readily applied to the exterior of cement blocks and when applied effectively and completely protect the blocks against absorbing moisture, to make a waterproof compound for preserving cement blocks and having as its basic element finely pulverized or ground metal of a nature that will corrode or rust when exposed to the atmosphere after the application thereof to the exterior of the cement blocks, and to improve cement blocks by rendering them waterproof through the application of the compound.

The invention consists in the process and in the new article of manufacture hereinafter described, and pointed out in the claims.

The preserving compound has as its basic element finely pulverized or powdered metal that has the characteristic of corroding or rusting when exposed to the atmosphere, and the metal can be iron, brass, or other analogous metal that will corrode or rust under exposure to the atmosphere. It is preferred to mix the finely pulverized or powdered metal with water, so as to form a liquid compound that can be applied by means of a brush or other suitable means over the exterior of the cement blocks; but the finely pulverized or powdered metal can be applied in a dry state and thoroughly rubbed into and over the exterior face of the block, after which water can be applied by means of a brush or otherwise, so as to form, in effect, a liquid compound which will enter and fill the pores of the block when the metal is changed to the condition of corrosion or rust by the atmosphere, and this whether the metal in its finely pulverized or powdered condition is first made into a compound by the addition of water or applied in a dry state and fixed by the application of water. While water is the preferred medium for making the compound, other liquids could be used for the purpose so long as such liquids would act to furnish a compound that would cause the pulverized or powdered metal to impregnate the pores of the cement block and when corroded or rusted fill the pores and render the block impervious to moisture.

The pores of the cement block are completely filled by the corrosion or rust of the finely pulverized or powdered metal by reason of the expanding of the metal from the effects of the oxygen on exposure in the atmosphere, and this expanding of the metal in corroding or turning to rust effectually fills and closes the pores of the cement block, so that water or moisture cannot enter and the block will be made moisture or water proof. The effect of the corroding or turning into rust of the finely pulverized or powdered metal is to give additional strength and tenacity to the block by reason of the filling of the pores, so that in addition to rendering the cement block water and moisture proof the strength and rigidity of the cement block is increased.

While the process and compound is especially adapted for use in rendering porous blocks impervious to water and moisture, whether said blocks are formed of cement or other material, it is to be understood that the compound and the process of applying the same is adapted for use and can be used for rendering wood and other porous material water and moisture proof, the application of the finely pulverized or powdered iron to wood and other fibrous and porous materials being the same as described for the application to cement blocks. While it is preferred to use water after applying the basic element of finely pulverized or powdered iron to the blocks or other object or material, the iron after its application when subjected to the effects of the atmosphere, and particularly a moist atmosphere, will corrode or rust and form a coating or covering within and on the exterior face of the block or other object by which the rendering of the block or object impervious to water or moisture is successfully and practically attained; and under the term "block" it is intended to include any cement work, such as sidewalks, floors, and other work employing cement.

What I claim as new, and desire to secure by Letters Patent, is—

1. The process of rendering cement waterproof, which consists in supplying to the surface of a previously-formed block of cement metallic iron in the form of a fine dust held in suspension in a liquid as water and afterward allowing the moist particles of iron to oxidize and expand and fill the pores in the surface of the cement, substantially as described.

2. The process of rendering a substance waterproof, which consists in applying to the surface of the substance metallic iron in the form of a fine dust held in suspension in a liquid as water and afterward allowing the moist particles of iron to oxidize and expand and fill the pores in the surface of the substance, substantially as described.

JOHN M. RAUHOFF.

Witnesses:
OSCAR W. BOND,
WALKER BANNING.